United States Patent [19]
Wong

[11] Patent Number: 5,831,886
[45] Date of Patent: Nov. 3, 1998

[54] CALCULATING A + SIGN(A) IN A SINGLE INSTRUCTION CYCLE

[75] Inventor: Roney S. Wong, Sunnyvale, Calif.

[73] Assignee: Samsung Electronics Co., Ltd., Seoul, Rep. of Korea

[21] Appl. No.: 719,186

[22] Filed: Sep. 24, 1996

[51] Int. Cl.$^6$ ........................................................ G06F 7/50
[52] U.S. Cl. ........................................ 364/768; 364/784.01
[58] Field of Search ....................................... 364/768, 770, 364/746.2, 715.012, 715.011, 715.02, 784.01; 395/562

[56] References Cited

U.S. PATENT DOCUMENTS

| | | | |
|---|---|---|---|
| 4,218,751 | 8/1980 | McManigal | 364/715.012 |
| 4,709,226 | 11/1987 | Christopher | 341/93 |
| 4,953,115 | 8/1990 | Kanoh | 364/715.012 |
| 5,267,187 | 11/1993 | Hsieh et al. | 364/784.01 |
| 5,373,459 | 12/1994 | Taniguchi | 364/715.012 |
| 5,574,671 | 11/1996 | Young et al. | 364/715.03 |

OTHER PUBLICATIONS

U.S. Application Serial No. 08/658,454, Filed Jun. 5, 1996, entitled "Zero Detect for Binary Sum" by R. Wong.
U.S. Application Serial No. 08/695,142, Filed Aug. 8, 1996, entitled "Zero Detect for Binary Difference" by R. Wong.

*Primary Examiner*—Reba I. Elmore
*Assistant Examiner*—Robert J. Dolan
*Attorney, Agent, or Firm*—Skjerven, Morrill, MacPherson, Franklin & Friel, LLP; David M. Sigmond

[57] ABSTRACT

The expression A+sign(A), where A is a signed binary integer represented in 2's complement form, sign(A) is equal to one when A is greater than zero, sign(A) is equal to zero when A is zero, and sign(A) is equal to negative one when A is less than zero, is calculated by bit-complementing A, bit-complementing($\bar{A}$+1) when A is less than zero, bit-complementing $\bar{A}$ when A is equal to zero, bit-complementing($\bar{A}$−1) when A is greater than zero and odd, and bit-complementing all bits except a least significant bit of $\bar{A}$ when A is greater than zero and even. Zero detect for A is provided by determining whether a first carry-out bit from ($\bar{A}$+0) and a second carry-out bit from ($\bar{A}$+1) have different logical values. In this manner, A+sign(A) can be calculated by a general purpose computer in a single instruction cycle.

11 Claims, 6 Drawing Sheets

CALCULATING A + SIGN(A) IN A SINGLE INSTRUCTION CYCLE

BACKGROUND OF THE INVENTION

1. Field of the Invention

The present invention relates to computer arithmetic, and more particularly to calculating the expression A+sign(A) for signed binary integers.

2. Description of Related Art

The Moving Picture Experts Group (MPEG) standard has emerged as the dominant standard for compressed digital video. The MPEG-1 standard specifies a compressed video bit-stream rate of approximately 1.5 megabits per second, and a compressed stereo audio bit-stream rate of approximately 250 kilobits per second. The second standard, MPEG-2, will specify compression rates for higher-bandwidth distribution media, and is in the process of being formalized. To meet the MPEG standard, video and audio compression and decompression products must rapidly process the various algorithms used to implement the MPEG standard.

In MPEG video signal processing, the basic video information processing unit is typically a macro-block, which has a 16×16 pixel matrix comprising four 8×8 luminance blocks, and two 8×8 chrominance blocks. Each pixel in a luminance block or chrominance block has an output corresponding to an unsigned integer number, and each macro-block is part of a much larger luminance or chrominance frame, as the case may be.

MPEG video signal processing includes a computation requirement for calculating sign 3 expressions such as 2A+sign(A) for each pixel in a block, where A is a signed binary integer, sign (A) is equal to one when A is greater than zero, sign(A) is equal to zero when A is zero, and sign (A) is equal to negative one when A is less than zero. For completeness, it is useful to be able to calculate other sign 3 expressions, such as A+sign(A).

FIG. 1 is a flow chart of algorithm 100, which is known, for calculating A+sign(A). At step 102, signed binary operand A is obtained. Decision step 104 tests whether A is zero. If A is zero, the algorithm branches to end step 112 since A provides A+sign(A). If A is nonzero, the algorithm branches to decision step 106 which tests whether A is negative. If A is negative, at step 108 A is decremented to obtain A−1, and the algorithm terminates at end step 112 since A−1 provides A+sign(A). Returning to decision step 106, if A nonnegative (and therefore greater than zero since A is nonzero) then at step 110 A is incremented to obtain A+1, and the algorithm terminates at end step 112 since A+1 provides A+sign(A). Conventional variations to algorithm 100 are apparent. For instance, A can be tested for being negative before A is tested for being zero. Although algorithm 100 and related variations are simple to implement, they normally require several instruction cycles.

Moreover, providing zero detect at decision step 104 may require a large amount of chip area or several instruction cycles using conventional approaches. For instance, zero detect of an n-bit operand can be provided by an n-bit OR gate coupled to an inverter. The OR gate outputs a zero, which the inverter converts to a one, only when the operand consists of zero's. Drawbacks to this approach include the increased fan-in of the OR gate, which increases chip area, and the delay associated with ORing each bit of the operand. Another known technique for zero detect of a binary operand includes serially right-shifting the operand, and inspecting the shifted-out bits one at a time. As soon as a shifted-out bit of one is detected then the operand must be nonzero, whereas if all shifted-out bits are zero's then the operand must be zero. A drawback to this approach is that the right-shifting operation can be relatively time consuming and particularly difficult to implement in a single instruction cycle.

Accordingly, a need exists for calculating A+sign(A) in a rapid and efficient manner.

SUMMARY OF THE INVENTION

An object of the invention is to provide rapid and efficient calculation of A+sign(A). In accordance with a preferred aspect of the invention, A+sign(A) is calculated by a general purpose computer in a single instruction cycle.

The present invention includes a method of operating a circuit to calculate A+sign(A). One embodiment of the method includes bit-complementing A to obtain $\overline{A}$, bit-complementing ($\overline{A}$+1) to obtain A+sign(A) when A is less than zero, bit-complementing $\overline{A}$ to obtain A + sign(A) when A is equal to zero, bit-complementing($\overline{A}$−1) to obtain A+sign(A) when A is greater than zero and A is odd, and bit-complementing all bits except a least significant bit of $\overline{A}$ to obtain A+sign(A) when A is greater than zero and A is even. Preferably, the method includes setting a constant C to one and selecting the bit-complement of the least significant bit of ($\overline{A}$+1) when A is less than zero, setting the constant C to zero and selecting the bit-complement of the least significant bit of $\overline{A}$ when A is zero, setting the constant C to negative one and selecting the bit-complement of the least significant bit of ($\overline{A}$−1) when A is greater than zero and A is odd, and setting the constant C to zero and selecting the least significant bit of $\overline{A}$ when A is greater than zero and A is even. Setting the constant C is in response to a sign bit of A, indicative of whether A is positive or negative, and a least significant bit of A, indicative of whether A is odd or even. The selecting is in response to the sign bit of A, the least significant bit of A, and a zero detect flag, indicative of whether A is zero or nonzero.

Furthermore, zero detect of A can be provided by determining whether a first carry-out bit from ($\overline{A}$+0) and a second carry-out bit from ($\overline{A}$+1) have different logical values.

The present invention also includes an apparatus for calculating A+sign(A). In one embodiment, the apparatus includes first and second inverter circuits, a data selector circuit, an adder circuit, and a multiplexer in combination. The first inverter circuit provides the bit-complement of A to a first operand input of the adder circuit. The data selector circuit sets a constant C to one when A is less than zero, to zero when A is zero, to zero when A is greater than zero and even, and to negative one when A is greater than zero and odd. The data selector circuit provides the constant C to a second operand input of the adder circuit. The adder circuit calculates ($\overline{A}$+1) at a sum output when A is less than zero, and ($\overline{A}$+0) at the sum output when A is equal to zero or when A is greater than zero and even, and ($\overline{A}$−1) at the sum output when A is greater than zero and odd. The second inverter circuit provides the bit-complement of the sum output. Finally, the multiplexer selects the least significant bit of the sum output when A is greater than zero and even, and otherwise selects the least significant bit of the second inverter circuit. Preferably, the adder circuit generates a first carry-out bit from the sum output and a second carry-out bit from a sum-plus-one output, and a zero detect circuit determines whether A is zero by determining whether the first and second carry-out bits have different logical values.

These and other objects, features and advantages of the invention will be further described and more readily apparent from a review of the detailed description of the preferred embodiments which follow.

BRIEF DESCRIPTION OF THE DRAWINGS

In the drawings, which are not necessarily drawn to scale, in which like reference characters indicate like parts.

DETAILED DESCRIPTION OF THE PREFERRED EMBODIMENTS

Figure 1:
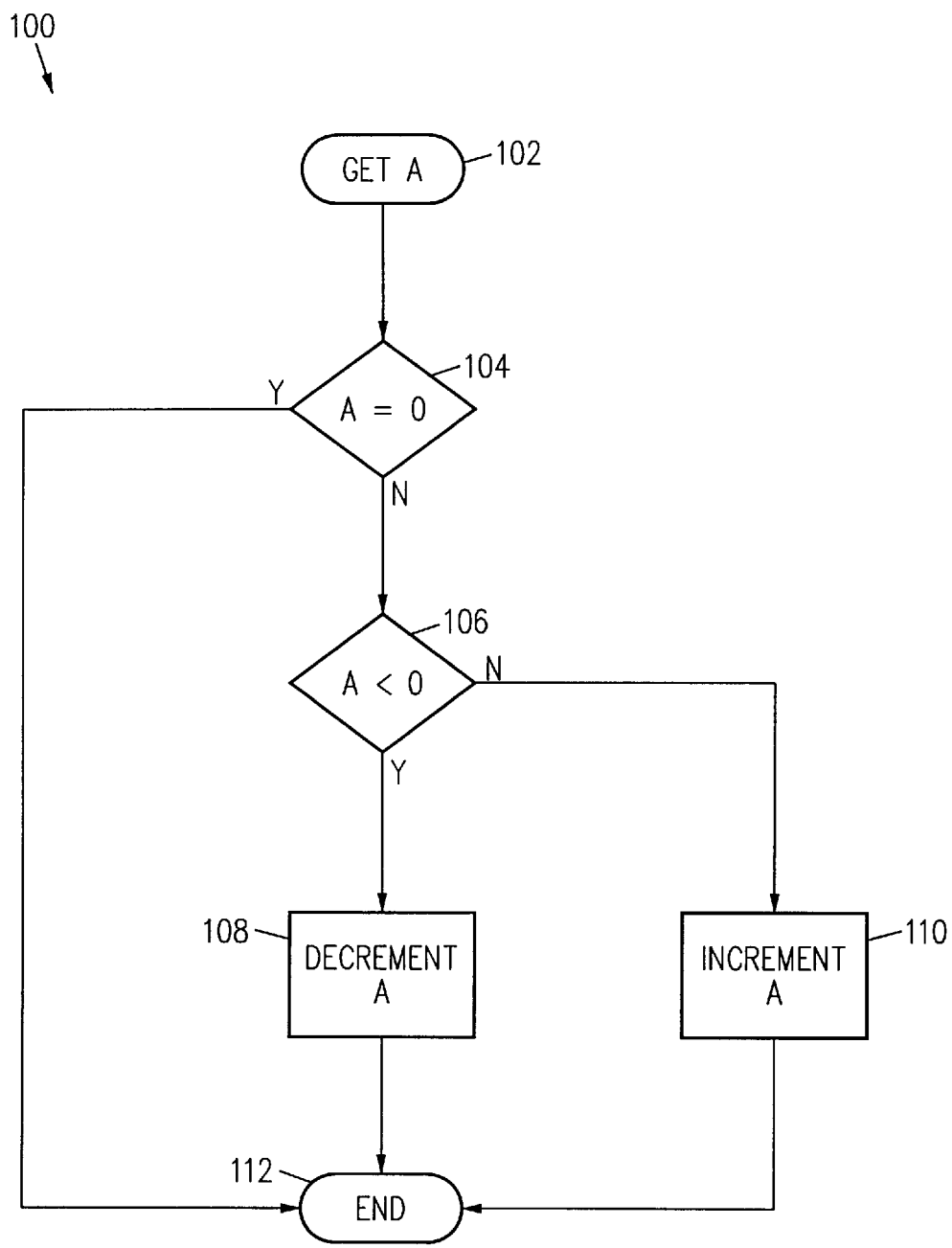
FIG. 1 is a flow chart of a known algorithm for calculating A+sign(A).

The present invention calculates A+sign(A) in a single instruction cycle by bit-complementing A to obtain $\bar{A}$, bit-complementing($\bar{A}$+1) to obtain A+sign(A) when A is less than zero, bit-complementing $\bar{A}$ to obtain A+sign(A) when A is equal to zero, bit-complementing ($\bar{A}$−1) to obtain A+sign(A) when A is greater than zero and A is odd, and bit-complementingall bits except a least significant bit of $\bar{A}$ to obtain A+sign(A) when A is greater than zero and A is even.

As used herein, A is a signed binary integer represented in 2's complement form. As mentioned above, sign(A) is equal to one when A is greater than zero, sign(A) is equal to zero when A is zero, and sign(A) is equal to negative one when A is less than zero. Determining whether A is positive (including zero) or negative is accomplished by inspection of its most significant bit ("MSB"). For a positive A the MSB=0, whereas for a negative A the MSB=1. Bit-complementing is equivalent to a 1's complement operation. For instance, $\bar{A}$ designates the bit-complement of A. Finally, incrementing refers to increasing by one.

The present invention is perhaps best understood by considering some of the underlying mathematics. In 2's complement representation, the negative of an integer number is provided by taking the 1's complement of the number and then incrementing, that is, $$-A = \bar{A}+1 \qquad (1)$$

$$\bar{A} = -A-1 \qquad (2)$$

Consider the following algebraic manipulations for A+sign(A) when A is less than zero:

$$A+\text{sign}(A) = A+(-1) \qquad (3)$$

$$A+\text{sign}(A) = A-1 \qquad (4)$$

$$A+\text{sign}(A) = -(-A)-1 \qquad (5)$$

$$A+\text{sign}(A) = \overline{-A} \qquad (6)$$

$$A+\text{sign}(A) = \overline{(-A-1)+1} \qquad (7)$$

$$A+\text{sign}(A) = \overline{\bar{A}+1} \qquad (8)$$

Consider the following algebraic manipulations for A+sign(A) when A is equal to zero:

$$A+\text{sign}(A) = A+(0) \qquad (9)$$

$$A+\text{sign}(A) = A \qquad (10)$$

$$A+\text{sign}(A) = \overline{\bar{A}} \qquad (11)$$

Consider the following algebraic manipulations for A+sign(A) when A is greater than zero:

$$A+\text{sign}(A) = A+(1) \qquad (12)$$

$$A+\text{sign}(A) = A+2-1 \qquad (13)$$

$$A+\text{sign}(A) = -(-A-2)-1 \qquad (14)$$

$$A+\text{sign}(A) = \overline{-A-2} \qquad (15)$$

$$A+\text{sign}(A) = \overline{(-A-1)-1} \qquad (16)$$

$$A+\text{sign}(A) = \overline{\bar{A}-1} \qquad (17)$$

Consider the following algebraic manipulations for A+sign(A) when A is greater than zero:

$$A+\text{sign}(A) = A+(1) \qquad (18)$$

$$A+\text{sign}(A) = A+1-1+1 \qquad (19)$$

$$A+\text{sign}(A) = (-(-A-1)-1)+1 \qquad (20)$$

$$A+\text{sign}(A) = \overline{-A-1}+1 \qquad (21)$$

$$A+\text{sign}(A) = \overline{\bar{A}}+1 \qquad (22)$$

In accordance with expression (8), when A is less than zero, A+sign(A) is provided by bit-complementing ($\bar{A}$+1). In accordance with expression (11), when A is equal to zero, A+sign(A) is provided by bit-complementing $\bar{A}$ (or $\bar{A}$+0). In accordance with expression (17), when A is greater than zero and A is odd, A+sign(A) is provided by bit-complementing ($\bar{A}$−1). In accordance with expression (22), when A is greater than zero and A is even, A+sign(A) is provided by bit-complementing $\bar{A}$ and then incrementing the result.

Referring still to expression (22), it is noted that if A is greater than zero and even, the least significant bit (LSB) of A must always must always be a zero, therefore the LSB of $\bar{A}$ must always be a one, the LSB of $\bar{\bar{A}}$ must always be a zero, and the LSB of $\bar{\bar{A}}$+1 must always be a one. Therefore, $\bar{\bar{A}}$+1 can be obtained in several ways, including (1) incrementing $\bar{\bar{A}}$; (2) providing $\bar{\bar{A}}$ and setting the LSB to one; (3) setting the LSB of $\bar{A}$ to zero and then bit-complementing the intermediate result; and (4) providing A and selecting the LSB of $\bar{\bar{A}}$ instead of $\bar{A}$. In all cases, $\bar{\bar{A}}$+1 is equivalent to bit-complementingall bits except the LSB of $\bar{A}$.

Figure 2:
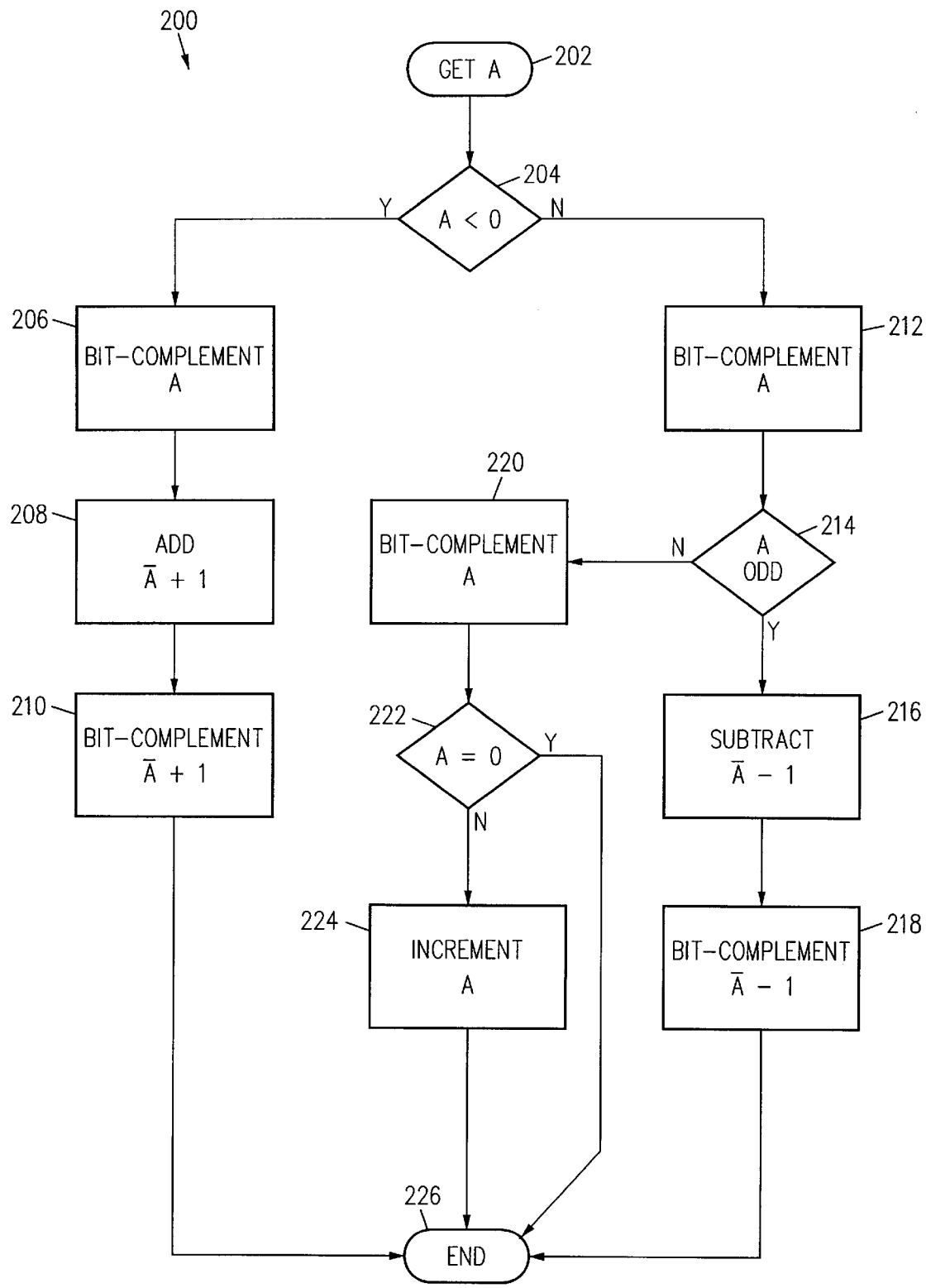
FIG. 2 is a flow chart of an algorithm for calculating A+sign(A) in accordance with an embodiment of the present invention.

FIG. 2 is a flow chart of algorithm 200 for calculating A+sign(A) in accordance with an embodiment of the invention. At step 202, signed binary operand A is obtained. Decision step 204 tests whether A is negative. If A is negative, at step 206 A is bit-complemented, at step 208 the sum $\bar{A}$+1 is calculated, at step 210 the sum $\bar{A}$+1 is bit-complemented to provide the result, and the algorithm terminates at end step 226. Returning to decision step 204, if A is nonnegative, at step 212 A is bit-complemented, and decision step 214 tests whether A is odd. If A is odd (and therefore greater than zero since A is also nonnegative)then at step 216 the difference $\bar{A}$−1 is calculated, at step 218 the difference $\overline{A}-1$ is bit-complemented to provide the result, and the algorithm terminates at end step 226. Returning to decision step 214, if A is not odd then at step 220 A is bit-complemented, and decision step 222 tests whether A is zero. If A is zero, the bit-complement of $\overline{A}$ provides the result and the algorithm terminates at end step 226. If A is nonzero (and therefore greater than zero and even since A is nonnegative and not odd), then at step 224 the bit-complement of $\overline{A}$ is incremented to provide the result and the algorithm terminates at end step 226.

Variations to algorithm 200 are apparent. For instance, A can be bit-complemented before the sign bit (or complemented sign bit) of A is inspected. For each value of A, the expressions $\overline{A}+1$, $\overline{A}-1$ and $\overline{A}+1$ can be calculated (concurrently if desired) with the appropriate expression selected depending on whether A is less than zero, equal to zero, greater than zero and odd, or greater than zero and even, respectively. Likewise, A can be tested for being less than zero, equal to zero, greater than zero and odd, or greater than zero and even before the appropriate expression is calculated.

Zero detect of A can be accomplished by bit-complementing A, and inspecting a carry-out bit from the MSB position generated by incrementing the bit-complement of A. The carry-out bit is a one only if the bit-complement of A is a string of one's, otherwise the carry-out bit is a zero. Furthermore, the bit-complement of A is a string of one's only if A is a string of zero's. Therefore, the carry-out bit generated by incrementing the bit-complement of A is a one only if A is zero. In a similar manner, zero detect of A can be accomplished by decrementing A, and inspecting a carry-out bit generated by incrementing A−1.

Zero detect of A can also be accomplished by generating a first carry-out bit from the MSB position of the sum $\overline{A}+0$, generating a second carry-out bit from the MSB position of the sum $\overline{A}+1$, and determining whether the first and second carry-out bits have different logical values. When A is zero, the first sum is a string of one's, the second sum is a string of zero's, and the first and second carry-out bits will have different logical values. Likewise, when A is nonzero, the first and second carry-out bits will have identical logical values. Advantageously, the first and second carry-out bits can be generated concurrently to provide rapid zero detect. Furthermore, the first and second carry-out bits can be generated without (or before) actually summing the numbers, for instance by use of PG generator sections and carry chains.

Thus, if A is an n-bit string of zero's, $\overline{A}+0$ is an n-bit string of one's that generates a first carry-out bit of zero from the MSB position, and $\overline{A}+1$ is an n-bit string of zero's that generates a second carry-out bit of one from the MSB position. Accordingly, the first and second carry-out bits have different logical values since A is zero.

The sums $\overline{A}+0$ and $\overline{A}+1$ can be generated by applying $\overline{A}$ and a constant C of zero to a sum and sum-plus-one adder. Remarkably, the sums $\overline{A}+0$ and $\overline{A}+1$ can be used for both calculating A+sign(A) and determining whether A is zero.

Further details regarding zero detect are set forth in U.S. application Ser. No. 08/658,454, filed Jun. 5, 1996, entitled "Zero Detect For Binary Sum" by R. Wong, which is incorporated herein by reference.

With regards to overflow, if A is an n-bit number, and A+sign(A) is an n-bit result, then overflow may occur. In particular, if A has the maximum positive or negative integer value, then adding sign(A) will cause overflow. Also, when overflow occurs, the MSB (or sign bit) of A and the MSB (or sign bit) of the result have different logical values. Therefore, overflow can be detected by EXCLUSIVE-ORing of the MSB of A and the MSB of the result.

Furthermore, when overflow occurs, it may be desirable to clamp the result to A, which already represents the maximum positive or negative integer value.

Alternatively, if A is an n-bit number and A+sign(A) is at least an n+1 bit result, then overflow does not occur. That is, an n+1 bit result accommodates A+sign(A), since A +sign (A) does not exceed 2A.

Various examples of calculating A+sign(A), in accordance with algorithm 200, where A is less than zero, with the possibility of overflow, are listed below in Table 1. Overflow occurs when the sign bit of A has a different logical value than the sign bit of the result. For illustration purposes, A is a 4-bit operand, and A+sign(A) is a 4-bit result.

TABLE 1

CALCULATING A + SIGN(A) WHERE A IS LESS THAN ZERO WITH POSSIBILITY OF OVERFLOW

| Operand A (decimal) | $\overline{A}$ | $\overline{A}$ + 1 | $\overline{A+1}$ [A + sign(A)] |
|---|---|---|---|
| 1000 (decimal −8) | 1000 ↓ 0111 | 0111 + 0001 0 1000 | 1000 ↓ 0111 (overflow) |
| 1010 (decimal −6) | 1010 ↓ 0101 | 0101 + 0001 0 0110 | 0110 ↓ 1001 (decimal −7) |
| 1101 (decimal −3) | 1101 ↓ 0010 | 0010 + 0001 0 0011 | 0011 ↓ 1100 (decimal −4) |
| 1111 (decimal −1) | 1111 ↓ 0000 | 0000 + 0001 0 0001 | 0001 ↓ 1110 (decimal −2) |

Various examples of calculating A+sign(A), in accordance with algorithm 200, where A is less than zero, without the possibility of overflow, are listed below in Table 2. For illustration purposes, A is a 4-bit operand, and A+sign(A) is a 5-bit result.

TABLE 2

CALCULATING A + SIGN(A) WHERE A IS LESS THAN ZERO WITHOUT POSSIBILITY OF OVERFLOW

| Operand A (decimal) | A sign extended | $\overline{A}$ | $\overline{A}$ + 1 | $\overline{A+1}$ [A + sign(A)] |
|---|---|---|---|---|
| 1000 (decimal −8) | 11000 | 11000 ↓ 00111 | 00111 + 00001 0 01000 | 01000 ↓ 10111 (decimal −9) |
| 1010 (decimal −6) | 11010 | 11010 ↓ 00101 | 00101 + 00001 0 00110 | 00110 ↓ 11001 (decimal −7) |
| 1101 (decimal −3) | 11101 | 11101 ↓ 00010 | 00010 + 00001 0 00011 | 00011 ↓ 11100 (decimal −4) |
| 1111 (decimal −1) | 11111 | 11111 ↓ 00000 | 00000 + 00001 0 00001 | 00001 ↓ 11110 (decimal −2) |

A single example of calculating A+sign(A), in accordance with algorithm 200, where A is equal to zero, is listed below in Table 3. For illustration purposes, A is a 4-bit operand, and A+sign(A) is a 4-bit result.

TABLE 3

CALCULATING A + SIGN(A) WHERE A IS EQUAL TO ZERO

| Operand A (decimal) | $\bar{A}$ | $\bar{\bar{A}}$ [A + sign(A)] |
|---|---|---|
| 0000 (decimal 0) | 0000 ↓ 1111 | 1111 ↓ 0000 (decimal 0) |

Various examples of calculating A+sign(A), in accordance with algorithm 200, where A is greater than zero and A is even, without the possibility of overflow, are listed below in Table 4. Overflow does not occur since A can not assume the maximum positive integer value (which is odd). For illustration purposes, A is a 4-bit operand, and A+sign(A) is a 4-bit result.

TABLE 4

CALCULATING A + SIGN(A) WHERE A IS GREATER THAN ZERO AND EVEN WITHOUT POSSIBILITY OF OVERFLOW

| Operand A (decimal) | $\bar{A}$ | $\bar{\bar{A}}$ | $\bar{\bar{A}}$ + 1 [A + sign(A)] |
|---|---|---|---|
| 0110 (decimal 6) | 0110 ↓ 1001 | 1001 ↓ 0110 | 0110 + 0001 $\overline{0\ 0111}$ (decimal 7) |
| 0100 (decimal 4) | 0100 ↓ 1011 | 1011 ↓ 0100 | 0100 + 0001 $\overline{0\ 0101}$ (decimal 5) |
| 0010 (decimal 2) | 0010 ↓ 1101 | 1101 ↓ 0010 | 0010 + 0001 $\overline{0\ 0011}$ (decimal 3) |

Various examples of calculating A+sign(A), in accordance with algorithm 200, where A is greater than zero and A is odd, with the possibility of overflow, are listed below in Table 5. Overflow occurs when the sign bit of A has a different logical value than the sign bit of the result. For illustration purposes, A is a 4-bit operand, and A+sign(A) is a 4-bit result.

TABLE 5

CALCULATING A + SIGN(A) WHERE A IS GREATER THAN ZERO AND ODD WITH POSSIBILITY OF OVERFLOW

| Operand A (decimal) | $\bar{A}$ | $\bar{A}$ - 1 ($\bar{A}$ - (-1)) | $\overline{\bar{A} - 1}$ [A + sign(A)] |
|---|---|---|---|
| 0111 (decimal 7) | 0111 ↓ 1000 | 1000 + 1111 $\overline{1\ 0111}$ | 0111 ↓ 1000 (overflow) |
| 0101 (decimal 5) | 0101 ↓ 1010 | 1010 + 1111 $\overline{1\ 1001}$ | 1001 ↓ 0110 (decimal 6) |
| 0011 (decimal 3) | 0011 ↓ 1100 | 1100 + 1111 $\overline{1\ 1011}$ | 1011 ↓ 0100 (decimal 4) |

TABLE 5-continued

CALCULATING A + SIGN(A) WHERE A IS GREATER THAN ZERO AND ODD WITH POSSIBILITY OF OVERFLOW

| Operand A (decimal) | $\bar{A}$ | $\bar{A}$ - 1 ($\bar{A}$ - (-1)) | $\overline{\bar{A} - 1}$ [A + sign(A)] |
|---|---|---|---|
| 0001 (decimal 1) | 0001 ↓ 1110 | 1110 + 1111 $\overline{1\ 1101}$ | 1101 ↓ 0010 (decimal 2) |

Various examples of calculating A+sign(A), in accordance with algorithm 200, where A is greater than zero and A is even, without the possibility of overflow, are listed below in Table 6. For illustration purposes, A is a 4-bit operand, and A+sign(A) is a 5-bit result.

TABLE 6

CALCULATING A + SIGN(A) WHERE A IS GREATER THAN ZERO AND ODD WITHOUT POSSIBILITY OF OVERFLOW

| Operand A (decimal) | A sign extended | $\bar{A}$ | $\bar{A}$ - 1 ($\bar{A}$ + (-1)) | $\overline{\bar{A} - 1}$ [A + sign(A)] |
|---|---|---|---|---|
| 0111 (decimal 7) | 00111 | 00111 ↓ 11000 | 11000 + 11111 $\overline{1\ 10111}$ | 10111 ↓ 01000 (decimal 8) |
| 0101 (decimal 5) | 00101 | 00101 ↓ 11010 | 11010 + 11111 $\overline{1\ 11001}$ | 11001 ↓ 00110 (decimal 6) |
| 0011 (decimal 3) | 00011 | 00011 ↓ 11100 | 11100 + 11111 $\overline{1\ 11011}$ | 11011 ↓ 00100 (decimal 4) |
| 0001 (decimal 1) | 00001 | 00001 ↓ 11110 | 11110 + 11111 $\overline{1\ 11101}$ | 11101 ↓ 00010 (decimal 2) |

Figure 3:
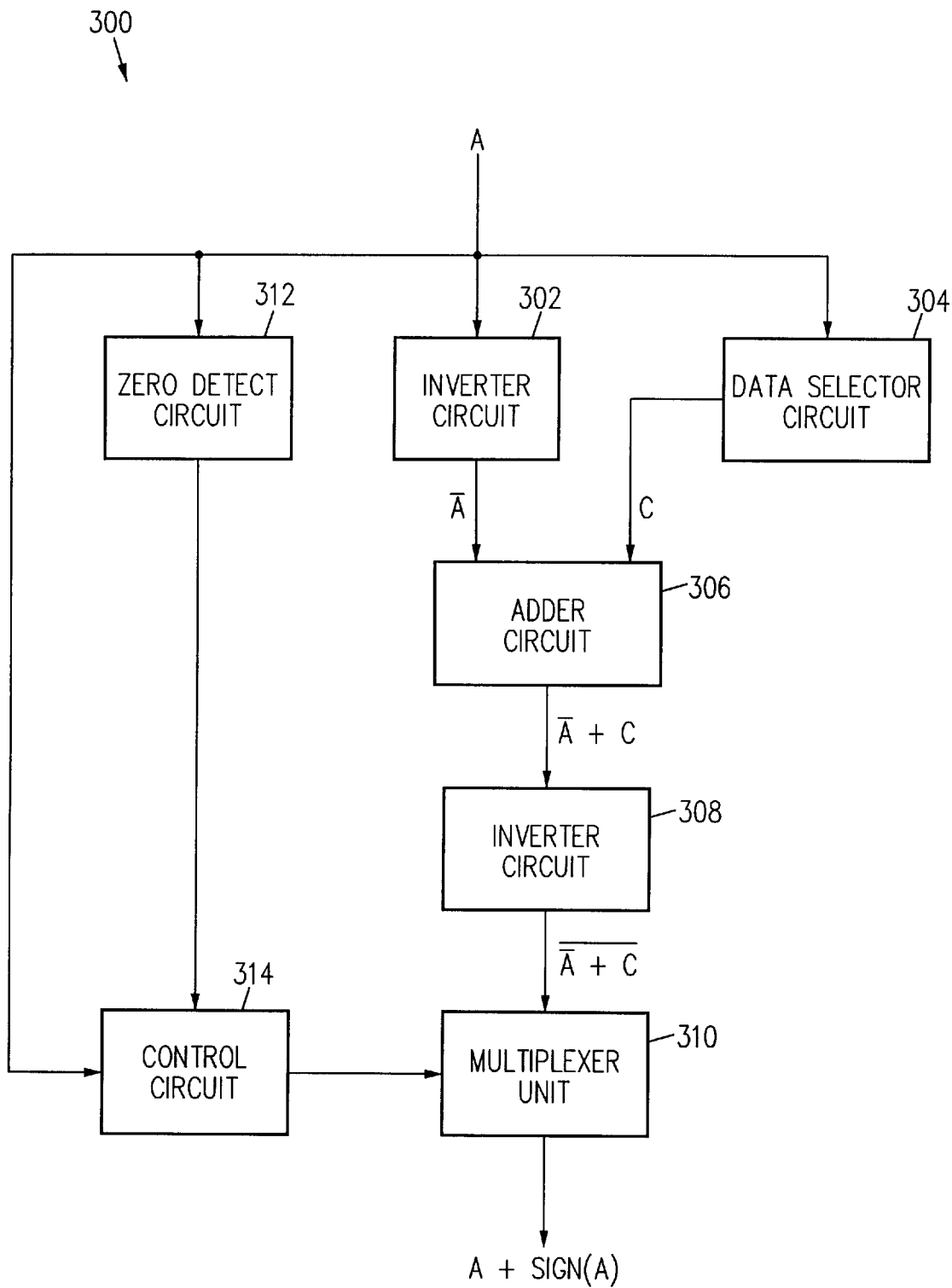
FIG. 3 is a block diagram of a logic circuit for calculating A+sign(A) in accordance with an embodiment of the present invention.

FIG. 3 is a block diagram of a logic circuit 300 for calculating A+sign(A) in accordance with an embodiment of the present invention. Inverter circuit 302 includes an operand input coupled to A and generates $\bar{A}$ at an output. Data selector circuit 304 includes an input coupled to the sign bit and least significant bit of A, and generates a constant C at its output set to one when A is less than zero, set to zero when A is zero, set to zero when A is greater than zero and even, and set to negative one when A is greater than zero and odd. Adder circuit 306 includes a first operand input for receiving $\bar{A}$ and a second operand input for receiving the constant C. Adder circuit 306 generates $\bar{A}$+C at a sum output. Thus, adder circuit 306 generates $\bar{A}$+1 when A is less than zero, and $\bar{A}$+0 when A is zero, $\bar{A}$+0 when A is greater than zero and even, and $\bar{A}$-1 when A is positive and odd. Inverter circuit 308 includes an operand input coupled to the sum output and generates the bit-complement of the sum output, or $\overline{\bar{A}+C}$. Multiplexer unit 310 receives $\overline{\bar{A}+C}$, and outputs either $\overline{\bar{A}+C}$ or $\overline{\bar{A}+C}$+1 in response to a control input. In effect, multiplexer unit 310 automatically outputs all bits except the LSB of $\overline{\bar{A}+C}$, and selects between the LSB of $\bar{A}$+C and the LSB of $\overline{\bar{A}+C}$ to provide the LSB of the output. Zero detect circuit 312 determines whether A is zero or nonzero, and control circuit 314 controls multiplexer unit 310 in response to zero detect circuit 312, the sign bit of A and the LSB of A. Control circuit 314 causes multiplexer unit 310 to output $\overline{A}+C$ when A is negative, A is zero, or A is greater than zero and odd, and otherwise causes multiplexer unit 310 to output $\overline{A}+C+1$ when A is greater than zero and even. In this manner, multiplexer unit 310 outputs $\overline{A}+1$ when A is less than zero, $\overline{A}$ when A is equal to zero, $\overline{A}-1$ when A is greater than zero and odd, and $\overline{A}+1$ when A is greater than zero and even.

Alternatively, if desired, zero detect circuit 312 can be modified to inspect carry-out bits from MSB positions of sum and sum-plus-one outputs of adder circuit 306, instead of inspecting A directly. Also, numerous techniques can be used to set the LSB of the result to one (thereby bit-complementing all bits except the LSB of $\overline{A}$) when A is greater than zero and even.

Figure 4:
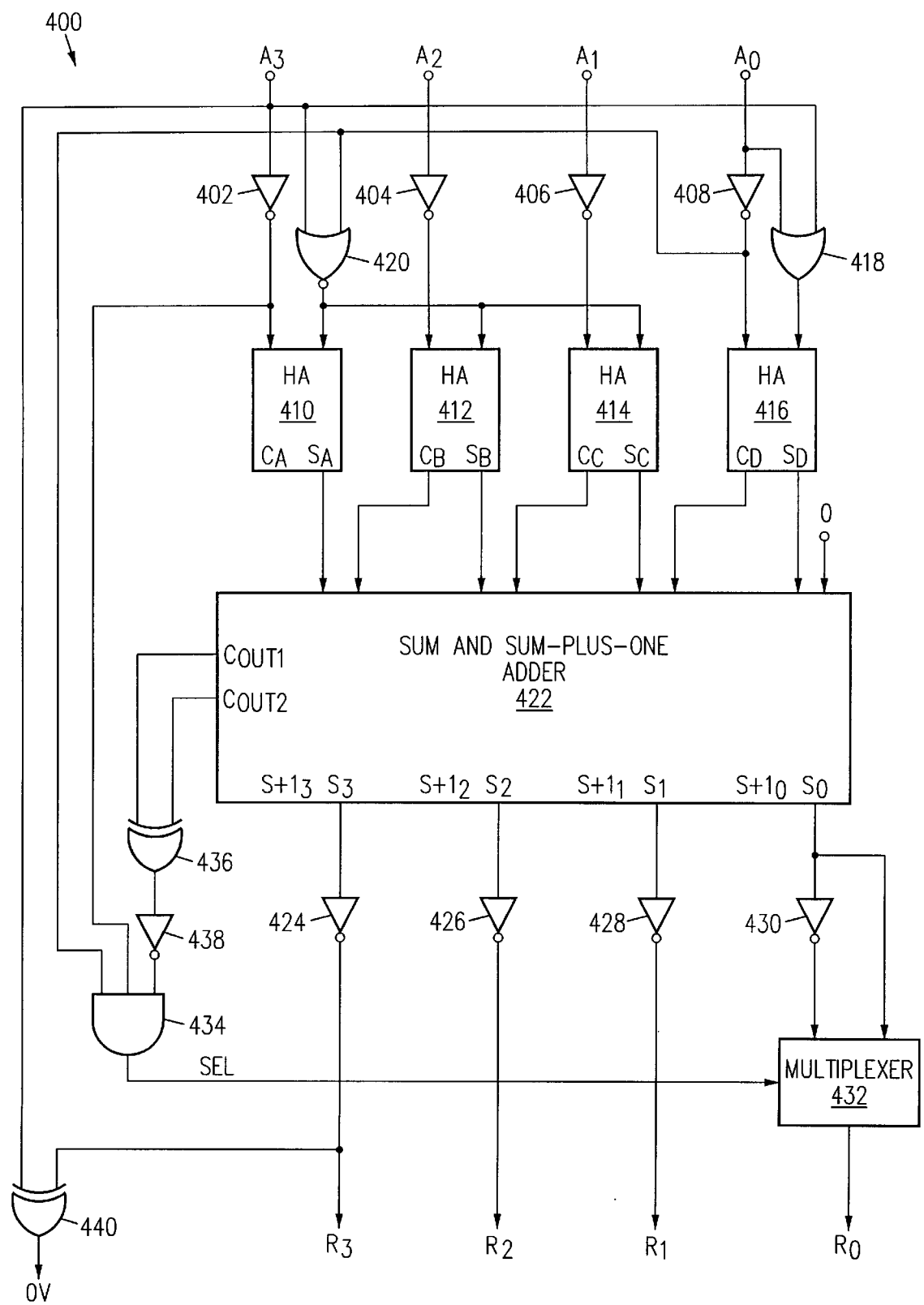
FIG. 4 is a block diagram of a logic circuit for calculating A+sign(A) in accordance with another embodiment of the present invention.

FIG. 4 is a block diagram of a logic circuit 400 for calculating A+sign(A) in accordance with another embodiment of the invention. Logic circuit 400 receives a four-bit operand A, consisting of bits $A_3$, $A_2$, $A_1$ and $A_0$, and calculates a four-bit result, consisting of bits $R_3$, $R_2$, $R_1$ and $R_0$. Bits $A_3$ and $R_3$ are the MSBs. Logic circuit 400 also generates overflow signal OV. Bit $A_3$ is applied to inverter 402, bit $A_2$ is applied to inverter 404, bit $A_1$ is applied to inverter 406, and bit $A_0$ is applied to inverter 408. Inverters 402, 404, 406 and 408 generate bits $\overline{A_3}$, $\overline{A_2}$, $\overline{A_1}$ and $\overline{A_0}$, respectively. Bit $\overline{A_3}$ is applied to a first operand input of half adder 410, bit $\overline{A_2}$ is applied to a first operand input of half adder 412, bit $\overline{A_1}$ is applied to a first operand input of half adder 414, and bit $\overline{A_0}$ is applied to a first operand input of half adder 416.

Furthermore, bits $A_3$ and $A_0$ are applied to OR gate 418, bits $A_3$ and $\overline{A_0}$ are applied to NOR gate 420, the output of NOR gate 420 is applied to second operand inputs of half adders 410, 412 and 414, and the output of OR gate 418 is applied to the second operand input of half adder 416. In this fashion, the outputs of NOR gate 420 and OR gate 418 provide a constant C that is applied to the second operand inputs of half adders 410, 412, 414 and 416. When bit $A_3$ is a one (and thus A is less than zero), OR gate 418 generates a one, NOR gate 420 generates a zero, and the constant C is one. When bit $A_3$ is a zero and bit $A_0$ is a zero (and thus A is zero, or A is greater than zero and even), OR gate 418 generates a zero, NOR gate 420 generates a zero, and the constant C is zero. Finally, when bit $A_3$ is a zero and bit $A_0$ is a one, OR gate 418 generates a one, NOR gate 420 generates a one, and the constant C is negative one.

The outputs of half adders 410, 412, 414 and 416 are applied to operand inputs of sum and sum-plus-one adder 422. In particular, sum bit $S_A$ of half adder 410 and carry-out bit $C_B$ of half adder 412 are applied to stage 3 of adder 422, sum bit $S_B$ of half adder 412 and carry-out bit $C_C$ of half adder 414 are applied to stage 2 of adder 422, sum bit $S_C$ of half adder 414 and carry-out bit $C_D$ of half adder 416 are applied to stage 1 of adder 422, and sum bit $S_D$ of half adder 416 and a zero are applied to stage 0 of adder 422. Accordingly, adder 422 generates a sum output, consisting of bits $S_3$, $S_2$, $S_1$ and $S_0$, and a sum-plus-one output, consisting of bits $S+1_3$, $S+1_2$, $S+1_1$ and $S+1_0$. Adder 422 also generates first carry-out bit $C_{OUT1}$ from stage 3 of the sum output, and second carry-out bit $C_{OUT2}$ from stage 3 of the sum-plus-one output. In fact, the sum-plus-one output need not be generated as long as second carry-out bit $C_{OUT2}$ is generated.

Bit $S_3$ is applied to inverter 424, bit $S_2$ is applied to inverter 426, bit $S_1$ is applied to inverter 428, and bit $S_0$ is applied to inverter 430. Inverters 424, 426, 428 and 430 generate bits $\overline{S_3}$, $\overline{S_2}$, $\overline{S_1}$ and $\overline{S_0}$, respectively. Bits $\overline{S_3}$, $\overline{S_2}$ and $\overline{S_1}$ provide bits $R_3$, $R_2$ and $R_1$, respectively. Furthermore, bits $\overline{S_0}$ and $S_0$ are applied to first and second operand inputs of 2:1 multiplexer 432, and select signal SEL is applied to a control input of multiplexer 432. Multiplexer 432 selects the first input thereof and outputs bit $\overline{S_0}$ to provide bit $R_0$ when signal SEL is a zero, and multiplexer 432 selects the second input thereof and outputs bit $S_0$ to provide bit $R_0$ when signal SEL is a one. AND gate 434 generates signal SEL as a one when (i) bit $\overline{A_3}$ is a one, indicating A is positive, (ii) EXCLUSIVE-OR gate 436 generates a zero and inverter 438 generates a one, due to first carry-out bit $C_{OUT1}$ from $\overline{A}+0$ and second carry-out bit $C_{OUT2}$ from $\overline{A}+1$ having identical logical values, indicating A is nonzero, and (iii) bit $\overline{A_0}$ is one, indicating A is even. Thus, AND gate 434 also generates signal SEL as a one only when A is greater than zero and even, and AND gate 434 generates signal SEL as a zero when A is less than zero, A is equal to zero, or A is greater than zero and odd.

Overflow detection is provided by EXCLUSIVE-OR gate 440, which indicates when bits $A_3$ and $R_3$ have different logical values. Accordingly, EXCLUSIVE-OR gate 440 generates overflow signal OV at its output.

Thus, when A is less than zero, bit $A_3$ is a one, adder 422 generates $\overline{A}+1$ at the sum output, inverters 424 to 430 generate $\overline{\overline{A}+1}$, signal SEL is a zero, multiplexer 432 selects bit $\overline{S_0}$, and the result is $\overline{A}+1$. When A is equal to zero, bits $A_3$ and $A_0$ are zero's, adder 422 generates $\overline{A}+0$ at the sum output, inverters 424 to 430 generate $\overline{\overline{A}}$, signal SEL is a zero, multiplexer 432 selects bit $\overline{S_0}$, and the result is $\overline{\overline{A}}$. When A is greater than zero and odd, bit $A_3$ is a zero and bit $A_0$ is a one, adder 422 generates $\overline{A}-1$ at the sum output, inverters 424 to 430 generate $\overline{\overline{A}-1}$, signal SEL is a zero, multiplexer 432 selects bit $\overline{S_0}$, and the result is $\overline{A}-1$. Finally, when A is greater than zero and even, bits $A_3$ and $A_0$ are zero's, adder 422 generates $\overline{A}+0$ at the sum output, inverters 424 to 430 generate $\overline{\overline{A}}$, signal SEL is a one, multiplexer 432 selects bit $S_0$, and the result is $\overline{\overline{A}+1}$.

Figure 5:
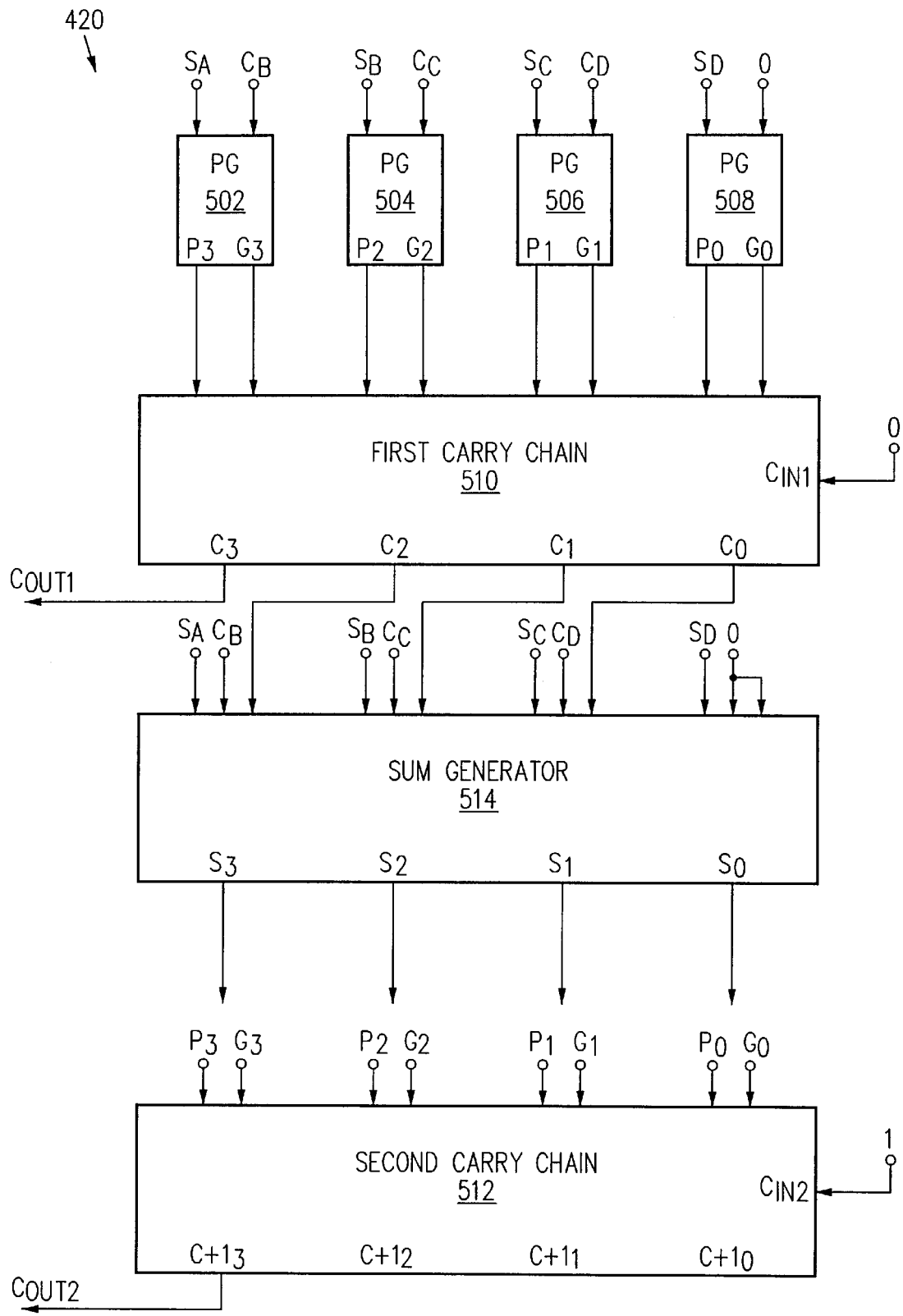
FIG. 5 is a block diagram of a sum and sum-plus-one adder suitable for use in the logic circuit of FIG. 4.

FIG. 5 shows an implementation for adder 422. In this implementation, the sum output is provided by a carry look ahead adder that performs fast addition within the basic step time of an instruction cycle. Propagate-generate(PG) sections 502, 504, 506 and 508 receive bits $S_A$ and $C_B$, $S_B$ and $C_C$, $S_C$ and $C_D$, and $S_D$ and a zero, respectively, and provide propagate and generate signals $P_3$ and $G_3$, $P_2$ and $G_2$, $P_1$ and $G_1$, and $P_0$ and $G_0$, respectively. The propagate and generate signals are furnished to respective stages of first carry chain 510 and second carry chain 512. First carry chain 510 receives a zero as its least significant carry-in bit $C_{IN1}$, and generates carry-out bits $C_3$, $C_2$, $C_1$ and $C_0$. Second carry chain 512 receives a one as its least significant carry-in bit $C_{IN2}$, and generates carry-outbits $C+1_3$, $C+1_2$, $C+1_1$ and $C+1_0$. Carry-out bit $C_3$ provides first carry-out bit $C_{OUT1}$, and carry-out bit $C+1_3$ provides second carry-out bit $C_{OUT2}$. Advantageously, first and second carry-out bits $C_{OUT1}$ and $C_{OUT2}$ are generated concurrently. Furthermore, sum generator 514 receives bits $S_A$, $C_B$ and $C_2$ at stage 3, bits $S_B$, $C_C$, and $C_1$ at stage 2, bits $S_C$, $C_D$ and $C_0$ at stage 1, and bit $S_D$ and a pair of zero's at stage 0. As a result, sum generator 514 generates sum bits $S_3$, $S_2$, $S_1$ and $S_0$. Each stage of sum generator 514 may include, for instance, first and second two-input EXCLUSIVE-OR gates (not shown), with the inputs of the first EXCLUSIVE-OR gate and the second input of the second EXCLUSIVE-OR gate receiving the bits to be summed, the output of the first EXCLUSIVE-OR gate coupled to the first input of the second EXCLUSIVE-OR gate, and the output of the second EXCLUSIVE-OR gate providing the sum bit. Also, if the sum-plus-one-output is desired, another sum generator can be utilized in a similar manner. Suitable PG sections, carry chains and sum generators are well-known in the art.

Figure 6:
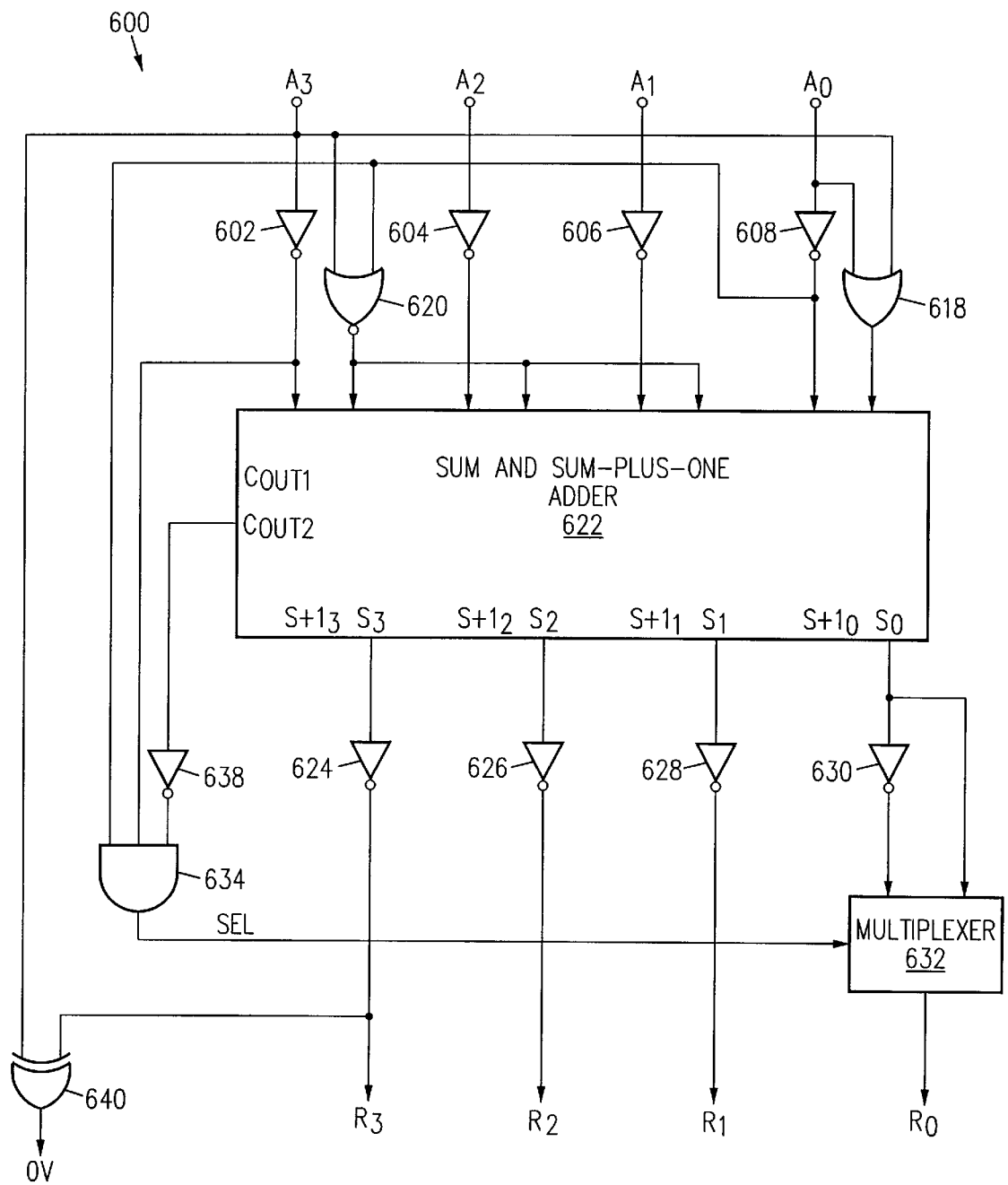
FIG. 6 is a block diagram of a logic circuit for calculating A+sign(A) in accordance with another embodiment of the present invention.

FIG. 6 is a block diagram of a logic circuit 600 for calculating A+sign(A) in accordance with another embodiment of the invention. Logic circuit 600 is a simplified version of logic circuit 400. The circuit elements in logic circuit 600 (inverter 602, adder 622, OR gate 634, etc.) correspond to the circuit elements in logic circuit 400 (inverter 402, adder 422, OR gate 434, etc.), and the related discussion need not be repeated. However, logic circuit 600 has no circuit elements corresponding to half adders 410 to 416 and EXCLUSIVE-OR gate 436. Instead, bit $A_3$ and the output of NOR gate 620 are applied to stage 3 of adder 622, bit $\overline{A_2}$ and the output of NOR gate 620 are applied to stage 2 of adder 622, bit $\overline{A_1}$ and the output of NOR gate 620 are applied to stage 1 of adder 622, and bit $\overline{A_0}$ and the output of OR gate 618 are applied to stage 0 of adder 622. Thus, A is applied to a first operand input of adder 622, and the constant C is applied to the second operand input of adder 622. As a result, adder 622 (like adder 422) generates $\overline{A}+1$ at the sum output when A is less than zero, $\overline{A}+0$ at the sum output when A is zero, $\overline{A}+0$ at the sum output when A is greater than zero and even, and $\overline{A}-1$ at the sum output when A is greater than zero and odd. Furthermore, since first carry-out bit $C_{OUT1}$ is always a zero when A is zero, second carry-out bit $C_{OUT2}$ is coupled directly to AND gate 634.

Although logic circuit 400 has more circuit elements than logic circuit 600, logic circuit 400 can be more easily adapted to accommodate other sign 3 operations.

The description of the invention set forth herein is illustrative, and is not intended to limit the scope of the invention as set forth in the following claims. A general purpose computer or processor can execute the invention in a single instruction cycle (as is preferred) or multiple instruction cycles. The invention is well-suited for many data processing applications. Variations and modifications of the embodiments disclosed herein may be made based on the description set forth herein, without departing from the scope and spirit of the invention as set forth in the following claims.

What is claimed is:

1. An apparatus for calculating A+sign(A), where A is a signed binary integer represented in 2's complement form, sign(A) is equal to one when A is greater than zero, sign(A) is equal to zero when A is zero, and sign(A) is equal to negative one when A is less than zero, comprising:

a first inverter circuit for bit-complementing A to obtain $\overline{A}$;

a data selector circuit for setting a constant C to one when A is less than zero, setting the constant C to zero when A is zero, setting the constant C to zero when A is greater than zero and A is even, and setting the constant C to negative one when A is greater than zero and A is odd;

an adder circuit for calculating $(\overline{A}+1)$ at a sum output when A is less than zero, for calculating $(\overline{A}+0)$ at the sum output when A is equal to zero, for calculating ($\overline{A}+0$) at the sum output when A is greater than zero and A is even, and for calculating $(\overline{A}-1)$ at the sum output when A is greater than zero and A is odd;

a second inverter circuit for bit-complementing the sum output; and a multiplexer for selecting between a least significant bit of an output of the second inverter circuit and a least significant bit of the sum output, wherein an output of the second inverter circuit with the least significant bit thereof replaced by an output of the multiplexer provides A+sign(A).

2. The apparatus of claim 1, wherein the adder circuit includes a first operand input coupled to $\overline{A}$, and a second operand input coupled to the constant C.

3. The apparatus of claim 1, including:

a zero detect circuit for determining whether A is zero or nonzero; and a control circuit for controlling the multiplexer in response to a sign bit of A, a least significant bit of A, and the zero detect circuit.

4. The apparatus of claim 1, including an overflow detection circuit for indicating overflow when a sign bit of A and a sign bit of the output of the second inverter circuit have different logical values.

5. An apparatus for calculating A+sign(A), where A is a signed binary integer represented in 2's complement form, sign(A) is equal to one when A is greater than zero, sign(A) is equal to zero when A is zero, and sign(A) is equal to negative one when A is less than zero, comprising:

a first inverter circuit having an operand input coupled to A and having an output for providing a bit-complement of A;

a data selector circuit coupled to a sign bit of A and a least significant bit of A, and having an output for setting a constant C to one when A is less than zero, setting the constant C to zero when A is zero, setting the constant C to zero when A is greater than zero and A is even, and setting the constant C to negative one when A is greater than zero and A is odd;

an adder circuit having a first operand input coupled to the output of the first inverter circuit, having a second operand input coupled to the output of the data selector circuit, and having a sum output representing a sum of the first and second operands;

a second inverter circuit having an operand input coupled to the sum output and having an output for providing a bit-complement of the sum output;

a zero detect circuit for determining whether A is zero or nonzero;

a multiplexer having a first input coupled to a least significant bit of the output of the second inverter circuit, having a second input coupled to a least significant bit of the sum output, and having a select input; and a control circuit, responsive to the sign bit of A and a least significant bit of A and the zero detect circuit, having a control output coupled to the select input of the multiplexer, which causes the multiplexer to select the first input thereof when A is less than zero, equal to zero, or greater than zero and odd, and causes the multiplexer to select the second input thereof when A is greater than zero and even;

wherein the output of the second inverter circuit with the least significant bit thereof replaced by an output of the multiplexer provides A+sign(A).

6. The apparatus of claim 5, wherein:

the control circuit causes the multiplexer to select the first input thereof when the sign bit of A is a one;

the control circuit causes the multiplexer to select the first input thereof when the zero detect circuit indicates A is zero;

the control circuit causes the multiplexer to select the first input thereof when the sign bit of A is a zero and the least significant bit of A is a one; and the control circuit causes the multiplexer to select the second input thereof when the sign bit of A is a zero and the zero detect circuit indicates A is nonzero and the least significant bit of A is a zero.

7. The apparatus of claim 5, wherein the data selector circuit includes:

an OR gate having inputs coupled to the sign bit of A and the least significant bit of A, and having an output coupled to a least significant stage of the adder circuit; and a NOR gate having inputs coupled to the sign bit of A and a bit-complement of the least significant bit of A, and having an output coupled to all stages except the least significant stage of the adder circuit.

8. The apparatus of claim 5, wherein the adder circuit includes a sum-plus-one output, representing a sum of the first and second operands plus one, and the zero detect circuit determines whether a first carry-out bit from the sum output and a second carry-out bit from the sum-plus-one output have different logical values.

9. The apparatus of claim 8, wherein the first and second carry-out bits are generated concurrently.

10. The apparatus of claim 5, wherein the adder circuit includes a row of carry save adders that provide the first and second operand inputs, a sum adder coupled to the carry save adders for providing the sum output, and a sum-plus-one adder coupled to the carry save adders for providing a sum-plus-one output.

11. The apparatus of claim 10, wherein:

the sum adder includes propagate-generate sections coupled to a first carry chain coupled to a first sum generator that provides the sum output, with the first carry chain having a carry-in bit set to zero; and the sum-plus-one adder includes the propagate-generate sections coupled to a second carry chain coupled to a second sum generator that provides the sum-plus-one output, with the second carry chain having a carry-in bit set to one.

* * * * *